(12) United States Patent
Kimmel et al.

(10) Patent No.: US 10,532,861 B2
(45) Date of Patent: Jan. 14, 2020

(54) PILL SORTER WITH BAG SEALER

(71) Applicant: Apothecary Products, LLC, Burnsville, MN (US)

(72) Inventors: Phil Kimmel, Apopka, FL (US); Wing Yen, Kowloon (HK)

(73) Assignee: Apothecary Products, LLC, Burnsville, MI (US)

( * ) Notice: Subject to any disclaimer, the term of this patent is extended or adjusted under 35 U.S.C. 154(b) by 605 days.

(21) Appl. No.: 14/706,120

(22) Filed: May 7, 2015

(65) Prior Publication Data

US 2016/0325859 A1 Nov. 10, 2016

(51) Int. Cl.
  *B65D 25/04* (2006.01)
  *B65D 47/04* (2006.01)
  *A61J 1/03* (2006.01)

(52) U.S. Cl.
  CPC ............. *B65D 47/04* (2013.01); *A61J 1/03* (2013.01); *B65D 25/04* (2013.01)

(58) Field of Classification Search
  CPC A61J 1/03; B65D 2583/0409; B65D 83/0454
  USPC .............................. 53/469; 221/91; 206/538
  See application file for complete search history.

(56) References Cited

U.S. PATENT DOCUMENTS

| | | | |
|---|---|---|---|
| 3,358,818 A | 12/1967 | Davis | |
| 4,117,952 A | 10/1978 | Grimes | |
| 4,288,006 A * | 9/1981 | Clover, Jr. | ........... B65D 47/265 206/534 |
| 4,378,266 A | 3/1983 | Gerken | |
| 4,691,821 A * | 9/1987 | Hofmann | ............... A47G 19/34 206/216 |
| 5,142,123 A | 8/1992 | Chou | |
| 5,322,166 A | 6/1994 | Crowther | |
| 5,603,429 A * | 2/1997 | Mulhauser | ............. B65D 83/04 221/171 |
| 5,791,514 A * | 8/1998 | Kirk, III | ................. G07F 11/54 221/155 |
| 6,058,998 A | 5/2000 | Kristen | |
| 6,068,158 A * | 5/2000 | Chabout | ............... A61J 7/0481 221/113 |

(Continued)

FOREIGN PATENT DOCUMENTS

FR 2860494 A1 4/2005

OTHER PUBLICATIONS

International Search Report in counterpart PCT/US2016/028018.

*Primary Examiner* — Chelsea E Stinson
(74) *Attorney, Agent, or Firm* — Merchant & Gould P.C.

(57) ABSTRACT

A pill sorter with bag sealer designed for the dispensation and storage of easily transportable packages of medication. The pill sorter has one or more independent chambers that can store pills or other medication. The pill sorter dispenses medication through a funneled lid, allowing the user to dispense a single chamber's medication into a plastic bag. The plastic bag is placed into a bag sealer having an activation button, light-emitting diode (LED), battery, microprocessor, and sealing element. The activation time of the sealing element is adjusted by the microprocessor based upon the measured level of charge present in the battery, providing a one-touch sealing solution to the user. The sealing element seals the plastic bag, which has a perforated seal, allowing for easy opening of the plastic bag when the medication is needed.

7 Claims, 8 Drawing Sheets

(56) References Cited

U.S. PATENT DOCUMENTS

| | | |
|---|---|---|
| 6,364,155 B1 | 4/2002 | Wolfe |
| 6,697,953 B1 | 2/2004 | Collins |
| 6,998,577 B2 | 2/2006 | Chou et al. |
| 8,424,143 B2 | 4/2013 | Stolper |
| 2004/0182873 A1 | 9/2004 | Baum |
| 2006/0163267 A1 | 7/2006 | Lapsker |
| 2007/0012712 A1 | 1/2007 | Syiau |
| 2010/0155411 A1 | 6/2010 | Solari |
| 2013/0248553 A1* | 9/2013 | Eriksson ............... A61J 7/0481 221/90 |

* cited by examiner

PILL SORTER WITH BAG SEALER

FIELD OF THE INVENTION

The present device relates to a system for sorting medications that must be taken on a daily basis, involving a pill sorter and an individual plastic bag sealer.

BACKGROUND

Life expectancy in the United States, and around the world, has been slowly rising each year. Cleaner water, better sanitation and nutrition, and a greater access to medical services has allowed individuals to live fuller and longer lives. Medical science continues to forge ahead in discovering new treatments and procedures to combat diseases and conditions that have plagued humans for centuries.

Among the continuing innovations in the medical sciences is the increasing amount of pharmaceutical treatments available for a variety of illnesses. Diseases that were once virtual death sentences, such as HIV, can now be managed through a strict regimen of pharmacological treatments. Additionally, more and more people are taking an increasing number of daily vitamins and supplements as prophylaxis against illness.

Unfortunately, keeping track of a daily regimen of pills can be a herculean task, especially when the regimen requires a strict adherence for effective treatment. Some treatments require dozens of pills daily. While many pill sorters have appeared in the market place, most do not allow for the easy arrangement of pills, nor do they allow the user to easily carry pills around on their person, especially when the user might be travelling to a remote location. What is needed is a pill sorting system that allows a user to sort medications and seal them into easily opened bags for transport.

SUMMARY OF THE INVENTION

It is an aspect of the disclosure to provide a pill sorter with a plastic bag sealer. These together with other aspects and advantages, which will be subsequently apparent, reside in the details of construction and operation as more fully hereinafter described and claimed, reference being had to the accompanying drawings forming a part hereof, wherein life numerals refer to like parts throughout.

A BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

The pill sorter with bag sealing system is designed to allow a user to separate their weekly regimen of medications into discrete daily packets and seal them for transport. The system can be comprised of two main components: the pill sorter and the bag sealer. The pill sorter can be a circular container divided into seven independent chambers. Each chamber can be filled with the user's medication for the day. The pill sorter can have a funneled lid that can rotate around the pill sorter's central axis. The funneled lid can have a funneled opening that can allow the user to dispense the pills contained in an independent chamber when the pill sorter is inverted. The pills can be dispensed into sealable plastic bags.

The sealable plastic bag can then be inserted into the bag sealer and heat-sealed to prevent leakage or loss of the pills contained in the bags. The bag sealer can contain a microprocessor, a battery, a sealing element, a light emitting diode (LED), and an activation button. The activation button is an on/off switch, and does not allow the user to determine the length of time the sealing element is active. Rather, the microprocessor can detect the level of charge present in the battery and compute the necessary application time required for the sealing element to remain active based upon the charge level of the battery. Lower charge levels result in lower temperatures generated by the sealing element, requiring longer activation times. In other words, if a low battery level is detected by the microprocessor, it will lengthen the amount of time the sealing element is active. Conversely, for higher battery levels, the microprocessor will shorten the time the sealing element is active. This can result in a one-push solution for the user, resulting in an identical seal regardless of the amount of time the user holds down the activation button.

Figure 1:
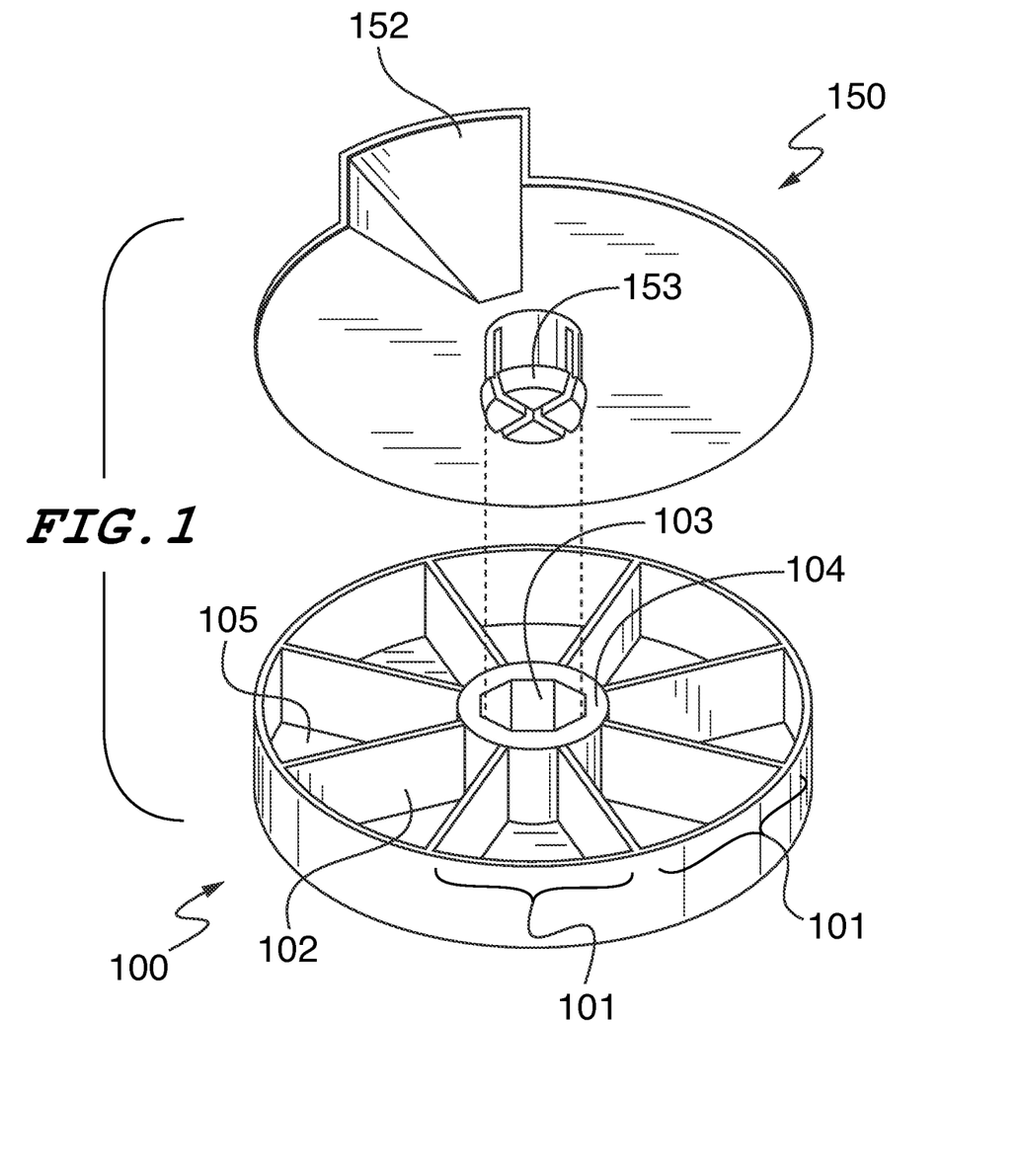
FIG. 1 is a perspective view of a pill sorter with a funneled lid, according to an embodiment.

FIG. 1 is a perspective view of a pill sorter 100 with a funneled lid 150, according to an embodiment. The pill sorter 100 can be manufactured out of plastic, metal, wood, pyrex, glass, or composite material. The pill sorter 100 can have one or more independent chambers 101 of sufficient size to fit multiple pills (not shown). Each independent chamber 101 can have two dividers 102, a bottom 105, and an open top. In an embodiment, the pill sorter 100 can have seven independent chambers 101, to match the seven days of the week. The chambers 101 can be joined at the dividers 102, the walls being of sufficient height such that pills are prevented from accidentally falling into another chamber. The pill sorter 100 can be circular in shape, with the chambers 101 being arranged around a central hub 104 having a mounting hole 103 for the funneled lid 150. The pill sorter can be defined by a circular outer perimeter and an inner perimeter. The mounting hole 103 can be octagonal in shape.

The funneled lid 150 can be manufactured out of plastic, metal, wood, pyrex, glass, or composite material. The funneled lid 150 can match the size and geometry of the pill sorter 100, such that there is no overlap or underlap when the funneled lid 150 is attached to the pill sorter 100. The funneled lid 150 can have four mounting rods 153 that can be configured to be inserted into the mounting hole 103 for connection to the pill sorter 100. The mounting rods can be slightly flexible, such that the mounting rods can be rotated within the mounting hole 103 without breaking. As the mounting rods 153 rotate within the mounting hole 103, they can compress. As the mounting rods 153 are rotated into position, the extra space in the octagonal mounting hole 103 allows the mounting rods 153 to expand, locking the lid 150 into position. Because the mounting rods 153 can be flexible, they can compress when inserted into the mounting hole. The funneled lid 150 can have a funneled opening 152, allowing enough space for one or more pills to exit the pill sorter with funneled lid. The funneled opening 152 extends upwards, while the mounting rods 153 extend downwards.

Figure 2:
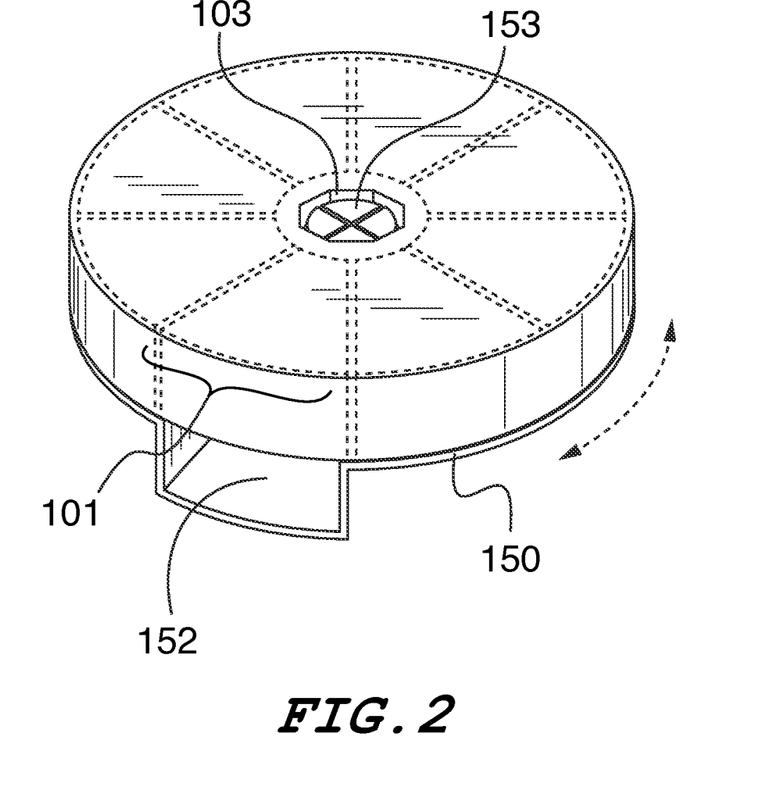
FIG. 2 is an underside view of a pill sorter with funneled lid, according to an embodiment.

FIG. 2 is an underside view of a pill sorter 100 with funneled lid 150, according to an embodiment. The funneled lid 150 can attach to the pill sorter 100 by the insertion of the mounting rods 153 into the mounting hole 103. The funneled lid 150 can rotate around the axis defined by the mounting hole 103, allowing the user (not shown) to dispense pills (not shown) from any of the independent chambers 101 using the funneled opening 152. The mounting rods 153, coupled with the mounting hole 103, can provide hard stopping points such that the funneled lid 150 fixes firmly in position for the dispensing of pills from a particular chamber 101 without overspill from an adjacent chamber.

Figure 3A:
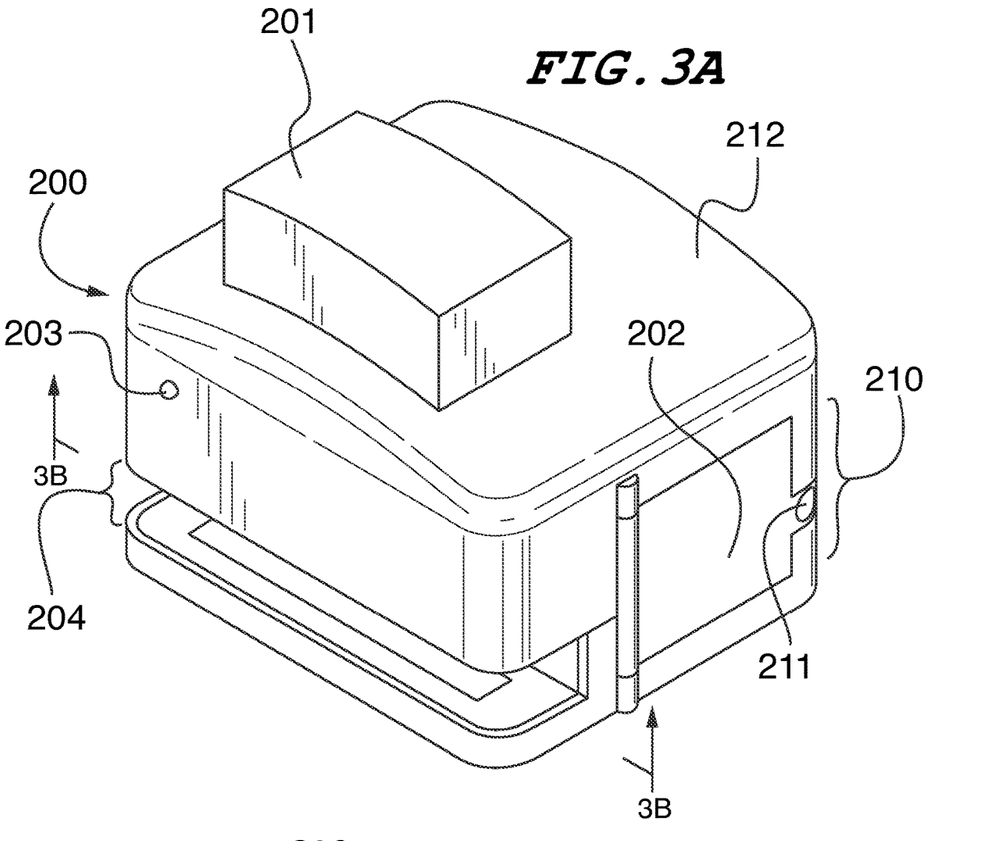
FIG. 3A is a perspective view of a bag sealer not in operation, according to an embodiment.

FIG. 3A is a perspective view of a bag sealer 200 not in operation, according to an embodiment. The bag sealer 200 can have a battery compartment 210, which can contain a battery (not shown). The battery can be rechargeable or disposable. The battery compartment 210 can be covered by a battery cover 202, which can be fixed to the body 212 of the bag sealer 200 using a screw 211 or other fixing mechanism. Alternatively, the battery cover 202 can slide into place. The bag sealer 200 can have an activation button 201, a light emitting diode (LED) 203, a bag insertion space 204, and a sealing element 205. To operate, the user can place a filled plastic bag (not shown) into the bag insertion space 204 and press the activation button 201. The sealing element 205 will activate for a duration proscribed by the bag sealer's microprocessor (not shown). While the sealing element 205 is activated, the LED 203 can illuminate. When the sealing element 205 ceases activation, the LED 203 can extinguish.

Figure 3B:
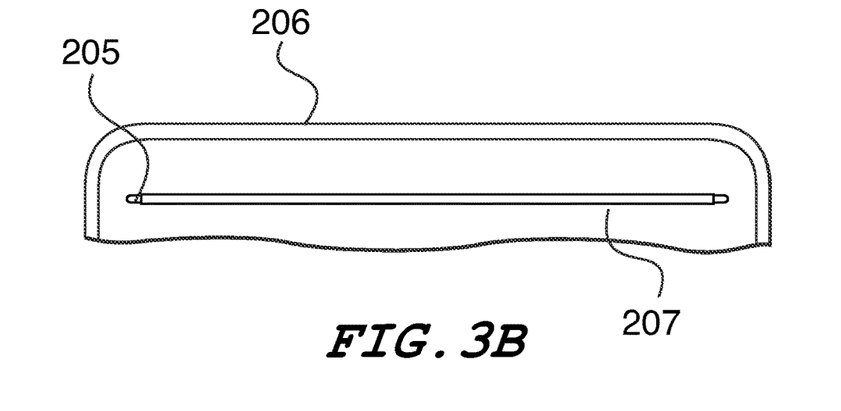
FIG. 3B is a bottom-up view of a bag insertion space for a bag sealer, according to an embodiment.

FIG. 3B is a bottom-up view of a bag insertion space for a bag sealer, according to an embodiment. The sealing element 205 can be a metal wire with a predetermined electrical resistance, such that when a current is applied heat is generated by the wire due to the resistance. The sealing element can be positioned behind the silicone strip 206. The sealing element 205 can alternatively be manufactured from ceramic, or from a nickel chromium alloy. The sealing element 205 can be covered by kapton tape 207, increasing the ease by which the plastic bag can be removed. The sealing element 205, when activated, can reach temperatures in a range of 170 to 190 degrees Celsius.

Figure 4:
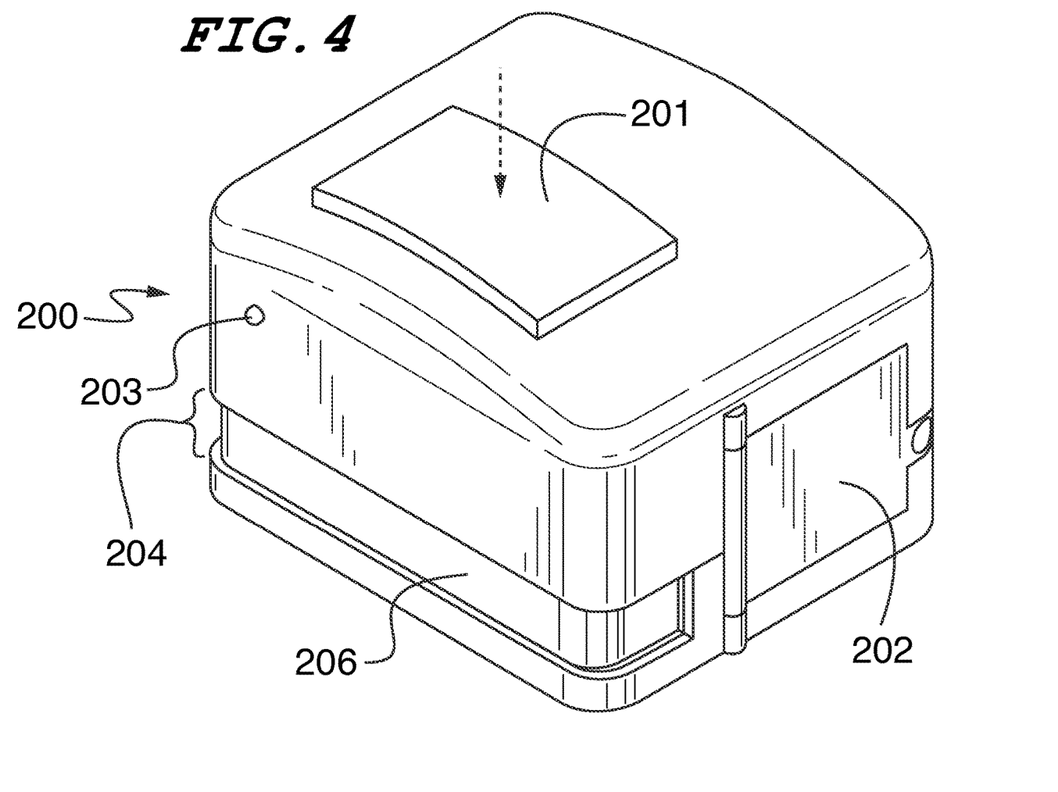
FIG. 4 is a perspective view of a bag sealer in operation, according to an alternate embodiment.

FIG. 4 is a perspective view of a bag sealer 200 in operation, according to an alternate embodiment. In an alternate embodiment, the bag insertion space 204 and the sealing element 205 can be covered by a silicone strip 206 while in operation, which can lower in order to protect the user from inadvertent contact with the sealing element 205 and to secure the bag (not shown) in place while being sealed. The silicone strip 206 can remain deployed as long as the activation button 201 is depressed. As power is applied to the sealing element 205, the sealing element 205 generates sufficient heat to melt a plastic bag and seal the bag's contents. The sealing element 205 can be a metal wire with a predetermined electrical resistance, such that when a current is applied heat is generated by the wire due to the resistance. The sealing element 205 can alternatively be manufactured from ceramic. The sealing element 205, when activated, can reach temperatures in a range of 170 to 190 degrees Celsius.

Figure 5:
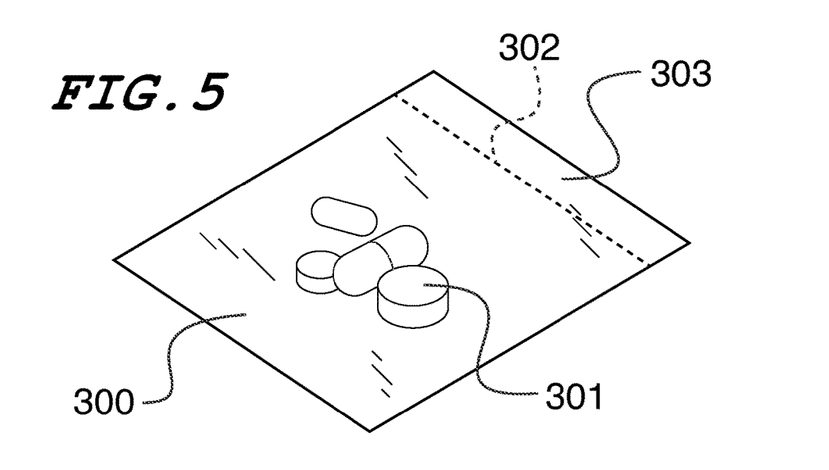
FIG. 5 is a perspective view of a sealed plastic bag containing pills, according to an embodiment.

FIG. 5 is a perspective view of a sealed plastic bag 300 containing pills 301, according to an embodiment. The plastic bag 300, once sealed, can have perforated seams 302, which can allow the user (not shown) easy access to the pills placed inside by tugging on a corner of the bag and removing the top portion 303.

Figure 6:
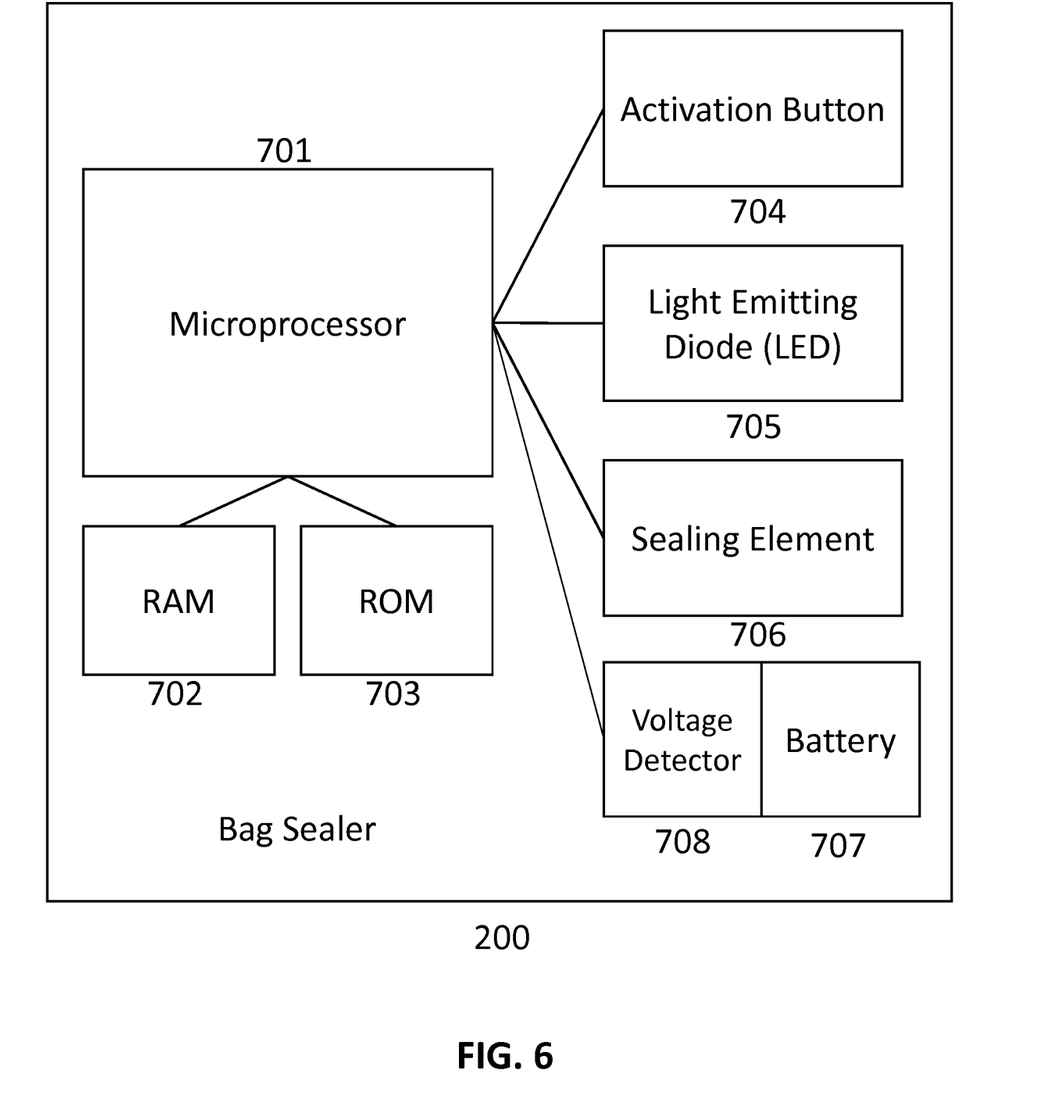
FIG. 6 is a block diagram describing the components of a bag sealer, according to an embodiment.

FIG. 6 is a block diagram describing the components of a bag sealer 200, according to an embodiment. The bag sealer 200 can contain a microprocessor 701, a battery 707, a sealing element 706, a light emitting diode (LED) 705, and an activation button 704. The activation button 704 can be an on/off switch, and cam not allow the user to determine the length of time the sealing element 706 is active. Rather, a voltage detector 708 (which can be a digital voltmeter or any other known component which can measure voltage and/or current) can detect the level of charge present in the battery 707 and send the value to the microprocessor 701, which compute the necessary application time required for the sealing element 706 to remain active based upon a comparison of the charge level of the battery 707 with a previously measured charge level of the battery 707. Lower charge levels can result in lower temperatures generated by the sealing element 706, requiring longer activation times. In other words, if a low battery level is detected by the voltage detector 708, the microprocessor 701 can lengthen the amount of time the sealing element 706 is active in order to compensate. Conversely, for higher battery levels, the microprocessor 701 can shorten the time the sealing element 706 is active to compensate for the higher power level. This can result in a one-push solution for the user, resulting in an identical seal regardless of the amount of time the user holds down the activation button 704 or the amount of charge in the battery 707. The microprocessor can connect to a module of random access memory (RAM) 702 that can be used to store transient information, such as last measured battery charge level. The microprocessor can connect to a module of read-only memory (ROM) 703 that can be used to store the bag sealer's basic input/output software (BIOS). The ROM 703 can be programmed to direct the microprocessor 701 to (after receiving the detected charge value from the voltage detector 708) control the sealing element 706 to activate it for a determined amount of time using any of the methods described herein. This operation can also be controlled by a hard-coded circuit for this purpose.

Figure 7:
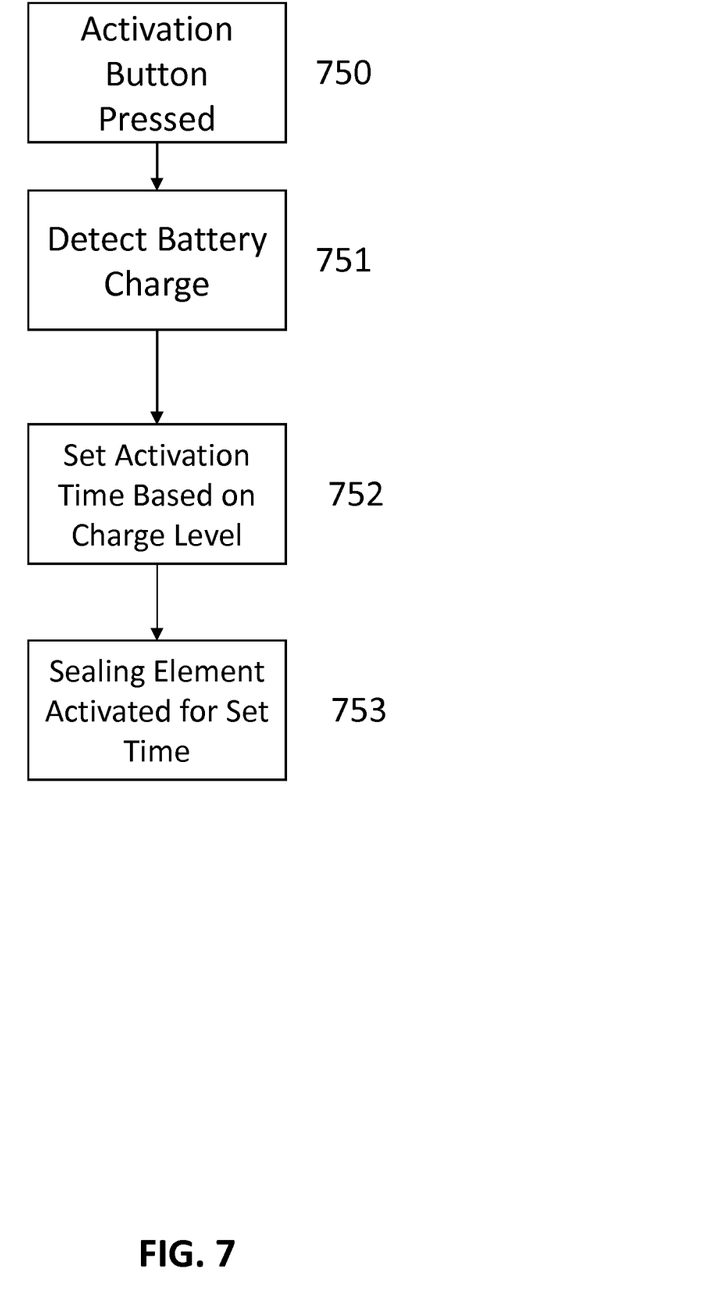
FIG. 7 is a flow chart diagramming a method of operation for a bag sealer, according to an embodiment.

FIG. 7 is a flow chart diagramming a method of operation for a bag sealer, according to an embodiment. In operation 750, the user can press the activation button, which leads to operation 751. In operation 751, the microprocessor can detect the level of charge present in the battery, and proceed to operation 752. In operation 752, the microprocessor can assign an activation time for the sealing element based upon the measured battery charge, and proceed to operation 753. This activation time can correspond to the values present in Table 1. In operation 753, power can be applied to the sealing element for the precise amount of time assigned by the microprocessor in the previous operations 752. After the amount of time expires, power can be withdrawn from the sealing element.

TABLE 1

| Battery Charge-X (in Volts) | Activation Time of Sealing Element (in Seconds) |
|---|---|
| X ≥ 4.65 V | 2.0 |
| 4.65 V > X ≥ 4.25 V | 2.5 |
| 4.25 V > X ≥ 4.05 V | 3.5 |
| 4.05 V > X ≥ 3.80 V | 5.0 |
| X < 3.80 V | 7.0 |

Figure 8:
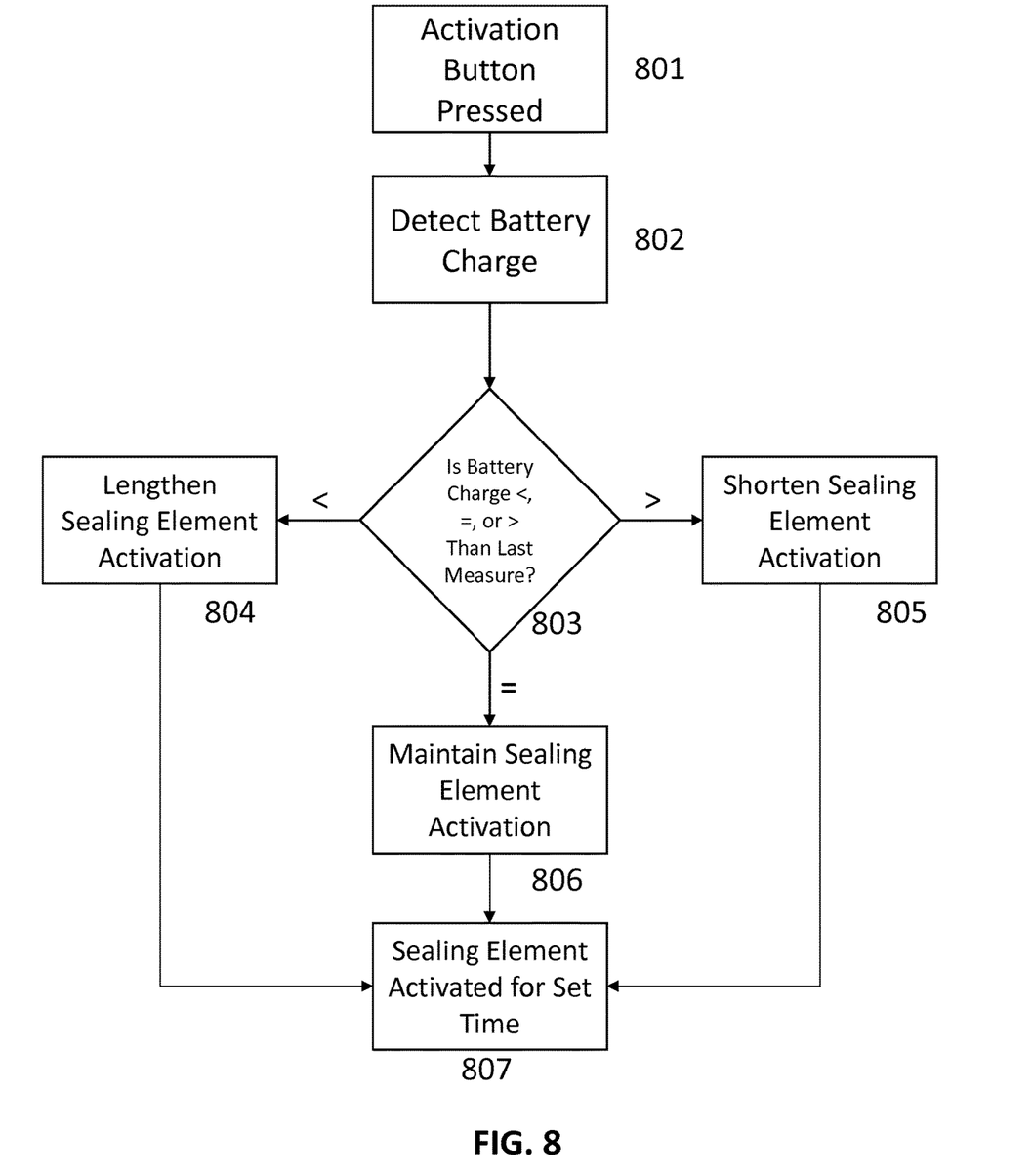
FIG. 8 is a flow chart diagramming a method of operation for a bag sealer, according to an alternate embodiment.

FIG. 8 is a flow chart diagramming a method of operation for a bag sealer, according to an alternate embodiment. In operation 801, the user can press the activation button, which leads to operation 802. In operation 802, the microprocessor can detect the level of charge present in the battery, and proceed to operation 803. In operation 803, the microprocessor can compare the measured charge with the previous charge measured during the last time the bag sealer was operated, a value which can be stored in the bag sealer's RAM. If, in operation 803, the measured level is less than the previous level, the method can proceed to operation 804, whereby the microprocessor can lengthen the amount of time the sealing element remains active. If, in operation 803, the measured level is greater than the previous level, the method can proceed to operation 805, whereby the microprocessor can shorten the amount of time the sealing element remains active. If, in operation 803, the measured level is equal to the previous level, the method can proceed to operation 806, whereby the microprocessor can maintain the amount of time the sealing element remains active. After operation 804, 805, or 806 is performed, the method can proceed to operation 807, whereby power can be applied to the sealing element for the precise amount of time calculated by the microprocessor in the previous operations 804, 805, or 806. After the amount of time expires, power can be withdrawn from the sealing element.

Figure 9A:
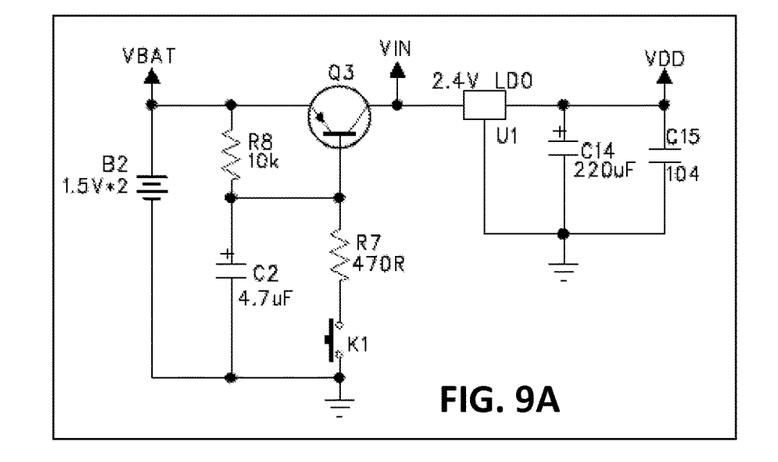
FIG. 9A is an example schematic diagram of a circuit implementing a bag sealer, according to an embodiment.

FIG. 9A is an example schematic diagram of a circuit implementing a bag sealer, according to an embodiment. The schematic diagram is one example of an implementation, however it can be appreciated that numerous other approaches can be taken as well.

Figure 9B:
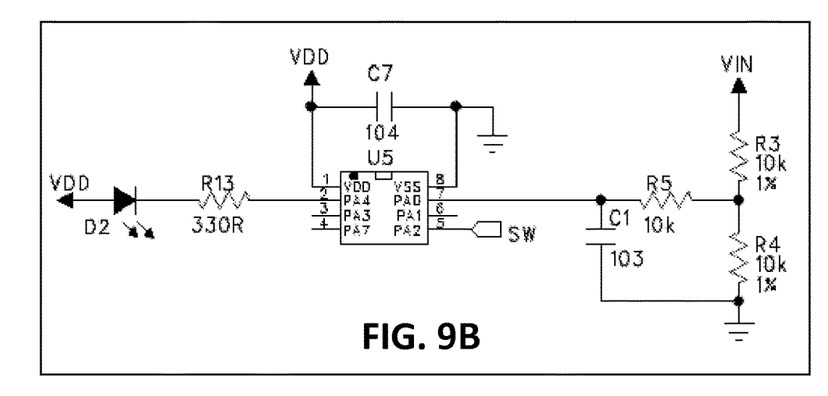
FIG. 9B is an example schematic diagram of a circuit implementing a bag sealer, according to an embodiment.

FIG. 9B is an example schematic diagram of a circuit implementing a bag sealer, according to an embodiment. The schematic diagram is one example of an implementation, however it can be appreciated that numerous other approaches can be taken as well.

Figure 9C:
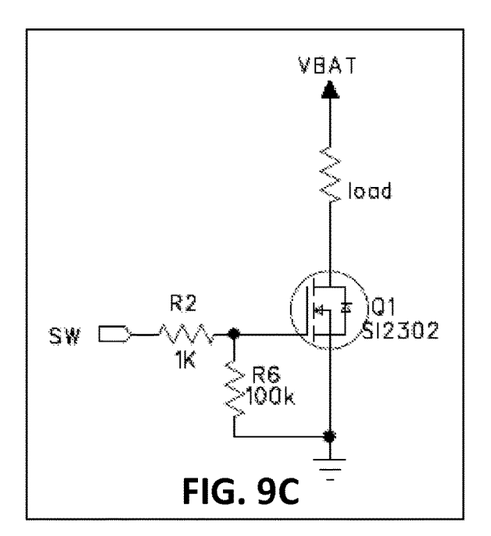
FIG. 9C is an example schematic diagram of a circuit implementing a bag sealer, according to an embodiment.

FIG. 9C is an example schematic diagram of a circuit implementing a bag sealer, according to an embodiment. The schematic diagram is one example of an implementation, however it can be appreciated that numerous other approaches can be taken as well.

Although the present device has been described in terms of exemplary embodiments, none is limited thereto. Rather, the appended claims should be construed broadly to include other variants and embodiments of the present apparatus, which may be made by those skilled in the art without departing from the scope and range of equivalents of either the apparatus or the methods for using such an apparatus.

What is claimed is:

1. A pill sorter, comprising:
    a circular outer perimeter;
    an inner perimeter located within the outer perimeter comprising a mounting hole inside the inner perimeter;
    a plurality of dividers between the outer perimeter and the inner perimeter, forming a plurality of chambers;
    a circular lid of substantially a same diameter as the outer perimeter, the circular lid comprising a mounting unit in a center of the lid and a funneled opening on the lid, the funneled opening formed by an outer axially projecting ramp sloping axially inwardly as the ramp extends from the opening at an outer rim of the lid in a direction toward the center of the lid;
    wherein the mounting unit is inserted into the mounting hole and the lid is configured to rotate over the outer perimeter.

2. The pill sorter as recited in claim 1, wherein each of the plurality of chambers is approximately a same size.

3. The pill sorter as recited in claim 1, wherein the funneled opening is approximately a same width as an outer width of each of the plurality of chambers.

4. The pill sorter as recited in claim 1, wherein the mounting unit comprises a plurality of mounting rods.

5. The pill sorter as recited in claim 4, wherein there are exactly four mounting rods.

6. The pill sorter as recited in claim 1, wherein the mounting unit and the mounting hole are configured such that lid locks into place with the funneled opening aligned with each of the plurality of chambers.

7. The pill sorter as recited in claim 1, wherein the mounting hole is octagonal.

* * * * *

UNITED STATES PATENT AND TRADEMARK OFFICE
CERTIFICATE OF CORRECTION

PATENT NO. : 10,532,861 B2  
APPLICATION NO. : 14/706120  
DATED : January 14, 2020  
INVENTOR(S) : Phil Kimmel and Wing Yen Page 1 of 1

It is certified that error appears in the above-identified patent and that said Letters Patent is hereby corrected as shown below:

On the Title Page

Column 1 (Assignee), Line 2:  
Delete "Burnsville, MI (US)" and insert -- Burnsville, MN (US) --

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*